Jan. 24, 1967   W. L. SONES ETAL   3,300,150
GARBAGE DISPOSAL SPEED CONTROL
Filed Aug. 31, 1964   2 Sheets-Sheet 1

INVENTORS
William L. Sones
James O. Elliott
BY George A. Neyhouse
J. C. Evans
Their Attorney INVENTORS
William L. Sones
James O. Elliott
George A. Neyhouse
BY
J.C.Evans
Their Attorney

United States Patent Office 3,300,150
Patented Jan. 24, 1967

3,300,150
GARBAGE DISPOSAL SPEED CONTROL
William L. Sones, Dayton, James O. Elliott, Xenia, and George A. Neyhouse, Dayton, Ohio, assignors to General Motors Corporation, Detroit, Mich., a corporation of Delaware
Filed Aug. 31, 1964, Ser. No. 393,204
7 Claims. (Cl. 241—36)

This invention relates to waste disposal systems and more particularly to domestic garbage disposal units having a control system for varying the operation thereof in accordance with types of waste matter being treated.

Typical domestic garbage disposal units are driven by an A.C. induction motor having a predetermined rate of rotation for driving a cutter or impeller at a set speed that is a compromise insofar as the various types of waste matter are concerned.

An object of the present invention, therefore, is to improve the operation of garbage disposal units by the provision of an improved control system in association therewith including a solid state semiconductor computer unit having semiconductor switch means therein for regulating the power supply to the motor and further including in combination therewith a waste programmer means for conditioning the computer to maintain a preselected motor speed corresponding to the type of waste material being treated.

A further object of the present invention is to improve the operation of garbage disposal units by means of a manually adjustable control member operatively associated with circuit means for conditioning a solid state semiconductor computer unit having switch means therein to maintain an A.C. drive motor of the unit at a predetermined speed at least in response to a speed feedback signal from the motor to the computer unit.

A still further object of the present invention is to improve the operation of garbage disposal units by the provision of a solid state computer unit responsive to a plurality of operative conditions in the unit for varying the speed of an A.C. induction drive motor thereof to prevent excessive speed of operation thereof and stalling thereof irrespective of the types of material being treated by a unit.

Further objects and advantages of the present invention will be apparent from the following description, reference being had to the accompanying drawings wherein a preferred embodiment of the present invention is clearly shown.

Figure 1:
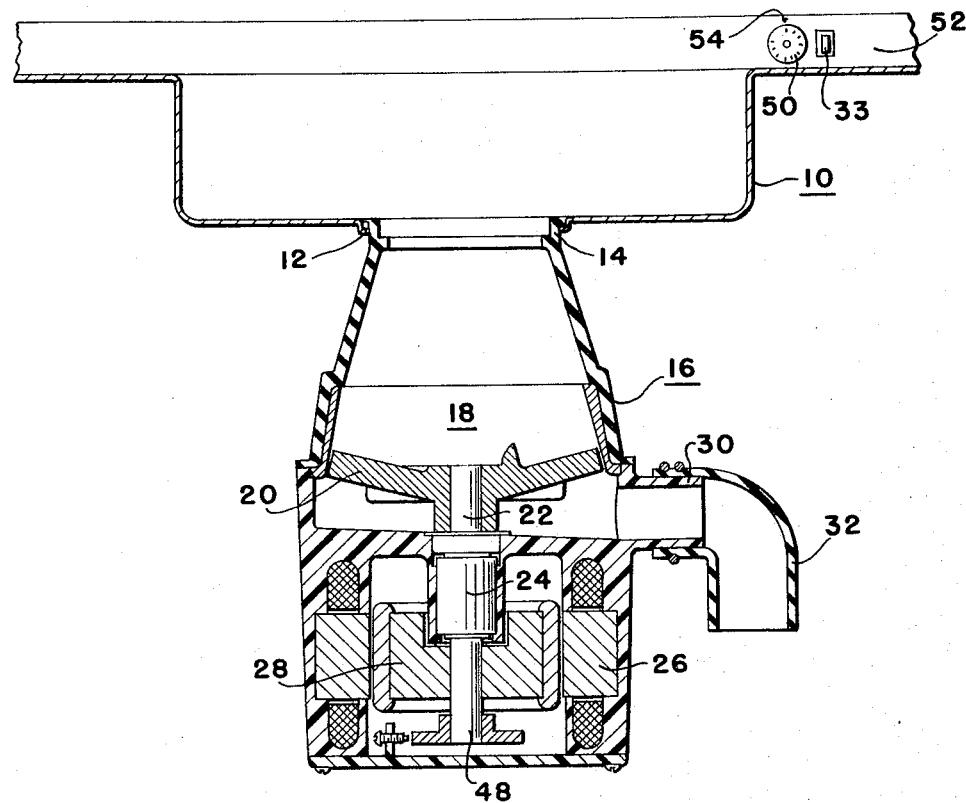
FIGURE 1 is a view in vertical elevation of a kitchen sink assembly having a garbage disposal unit in association therewith controlled in accordance with the present invention.

Referring now to the drawings, in FIGURE 1, a kitchen sink assembly 10 is illustrated having an outlet opening 12 therein that supportingly receives an open ended upper portion 14 of a garbage disposal unit 16. The open ended portion 14 diverges downwardly to form a material grinding chamber 18 in which a rotatable impeller or grinder 20 is disposed. The impeller 20 is secured for rotation with an extension 22 of a drive shaft 24 in an electric drive 26 which preferably is of the A.C. induction type. Material treated by the grinder 20 in the chamber 18 is discharged through a side outlet opening 30 through a conduit 32 into the drain system associated with the sink 10.

In accordance with certain of the principles of the present invention, when the motor 26 is turned on by a switch 33, it is maintained at a predetermined speed norm corresponding to the type of material being treated whereby the grinder 20 is rotated at varying rates that are best suited to quickly dispose of different types of material entering the disposal unit 16 through the open end portion 14 thereof without excessive vibration.

Figure 2:
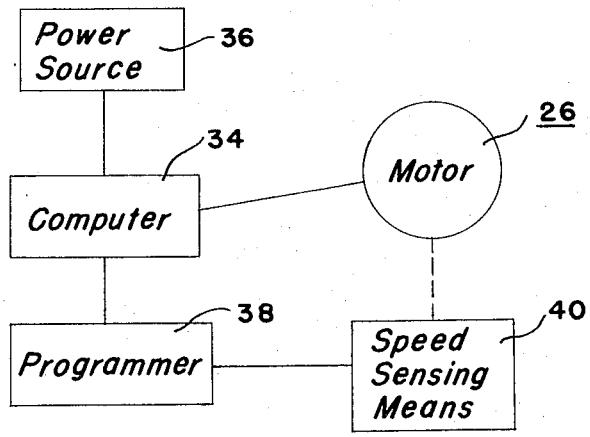
FIGURE 2 is a block diagram of the control system of the present invention.

In FIGURE 2, the motor control is illustrated as including a computer control unit 34 for controlling the power supply to the motor 26 from a power source 36 under the control of a waste programmer 38 that modifies a speed signal transmitted to the motor 26 from a speed sensing means 40.

The computer control unit 34, which is preferably a static solid state semiconductor system, meters 60-cycle power from the power source 36 to the motor 26 by varying the average voltage input to the motor to thereby vary its speed of operation for producing variable grinding effects best suited for the types of materials being fed into the unit 16.

Figure 3:
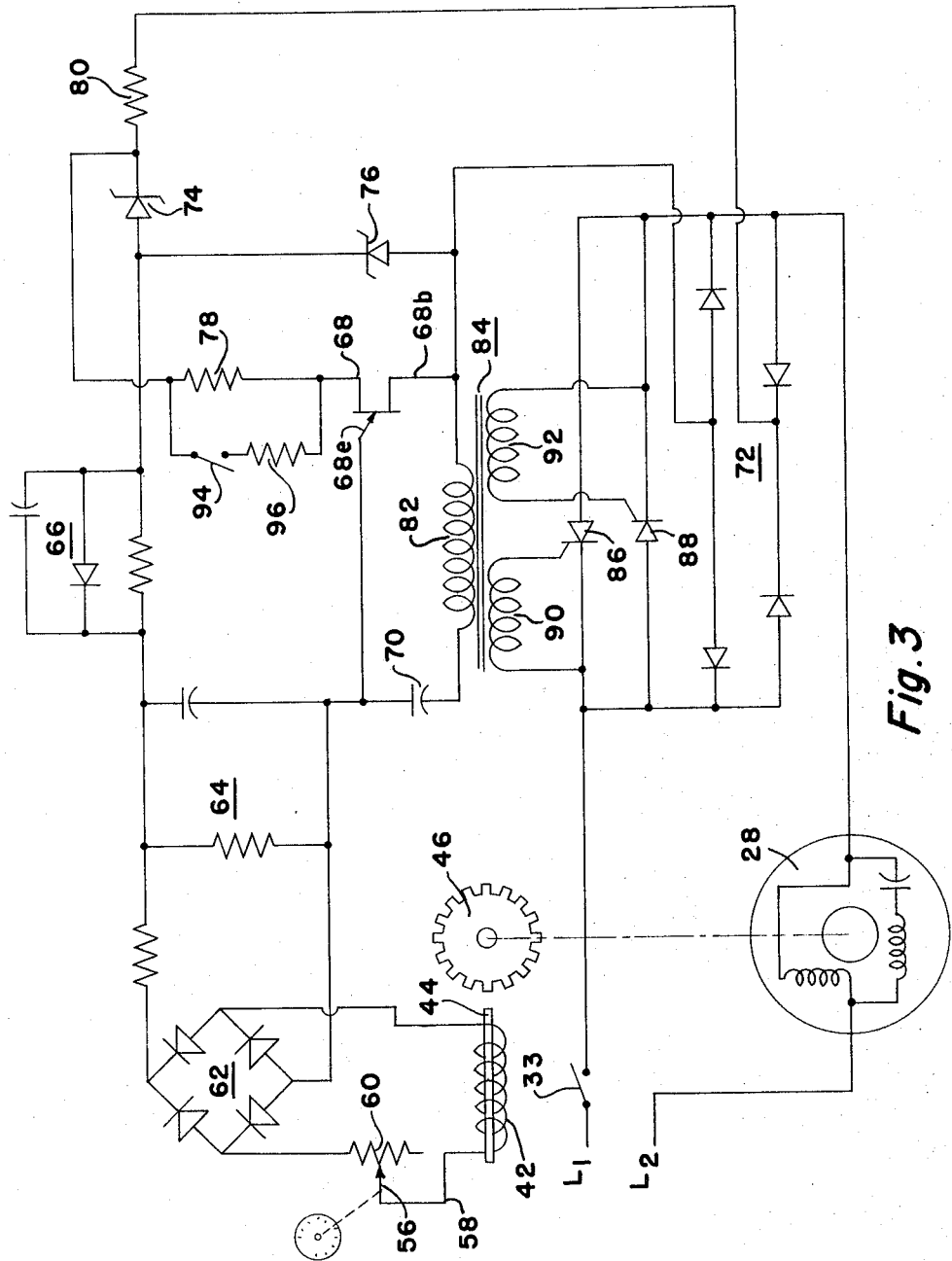
FIGURE 3 is a diagrammatic electrical circuit showing the computer control unit and programmer system of the present invention.

In the illustrated arrangement of the invention, the speed sensing means 40 includes a permanent magnet pickup means similar to the type used in dynamometers including a number of turns of wire 42 wound on a permanent magnet 44, as best illustrated in FIGURE 3. The speed pickup is supported on the motor housing so that the small permanent magnet 44 is located in radial alignment adjacent an outwardly toothed wheel 46 suitably secured to a shaft extension 48 of the motor 26 for rotation therewith whereby the wheel 46 is located within the housing of the motor 26, as illustrated in FIGURE 1. As the toothed wheel 46 rotates, the permanent magnet pickup 44 is subjected to varying air gaps and the effective reluctance change causes flux changes therein which induce a varying voltage in the coil 42 to be fed through the waste programmer 38 to the computer 34.

The waste programmer 38 includes a manually adjustable member or knob 50 representatively shown as being located on the backsplash 52 of the sink assembly 10 and as including indicia thereon movable with respect to an indicator for presetting the control system to operate the motor 26 in accordance with particular types of materials being directed into the disposal unit 16. For example, the indicia on the knob 50 may include a normal waste setting, a hard-to-grind food setting for bones and the like and other suitable settings of a similar nature.

The manual control knob 50, as shown in FIGURE 3 is operatively connected to a contact carrying arm 56 electrically connected by a conductor 58 to one of the terminals from the coil 42. Movement of the knob 50 will move the contact carrying arm 56 with respect to a resistance element 60 of a potentiometer 61 for varying the speed signal to the computer unit 34 so as to modulate the input signal to correspond to the particular materials being treated. The modified voltage signal to the computer 34 varies both in frequency and amplitude depending upon the speed of rotation of the motor 26 and the power supply to the motor 26 will be increased and decreased to maintain a predetermined speed norm that is best suited for treating particular types of material related to settings established by the waste programmer 38.

Referring now more particularly to the computer control unit 34, the modified input signals to the computer unit 34 are rectified by a full-wave rectifying bridge 62 and passed therefrom to capacitive filter unit 64. The filtered signal, in response to variations of the input signal from the magnetic speed pickup as modified by the waste programmer 38, is then directed through a solid state semiconductor network including unijunction transistor 68, connected emitter 68e to base 68b across a capacitor 70. The filtered signal from the magnetic speed pickup regulates firing of the transistor 68 in combination with a control or reference potential produced by a bridge circuit 72 that rectifies a residential A.C. power source across SCR's 86, 88 to D.C. power. The output of the bridge 72 is, in turn, regulated by Zener diodes 74, 76 in conjunction with resistances 78, 80. Depending upon the imbalance between the control potential produced by the bridge 72 that is fed through a filter unit 66 to the filter unit 64 and the variable input signal from the bridge 62 and capacitive filter 64, the unijunction transistor 68 fires to produce a switch control signal in a primary coil 82 of a pulse transformer 84. Firing of the transistor 68 causes the capacitor 70 to discharge through a low impedance path from the transistor emitter 68e through base 68b and the primary coil 82 so as to produce a voltage spike therein. The voltage spike operates a solid state power supply switch for varying the average voltage supply to the motor 26. In this embodiment of the invention the power supply switch is representatively illustrated as including a pair of oppositely facing silicon controlled rectifiers 86, 88 which are actuated by voltage induced in the secondary coils 90, 92 of the transformer 84 to be conductive for a predetermined period of the full-wave form of the A.C. power supply across the lines $L_1$, N to produce a variable energization of disposal motor 26 that maintains the operative speed thereof at a substantially exact speed norm corresponding to the preset type of waste material programmed by positioning the manually actuatable control member 50. By varying the position of the control member 50, the speed signal is modified by the potentiometer 61 to create a greater or lesser imbalance between the filtered signal from the bridge 62 and the signal from the bridge 72 for varying the firing rate of the unijunction transistor 68 controlling the solid state switches 86, 88.

In addition to the infinite range of speed controls afforded by the waste programmer 38, the improved control system may include a vibration sensing capability that will slow the motor speed 26 sufficiently to reduce transmission of vibrations into the sink assembly 10 caused by extreme operating conditions as, for example, the grinding of bones or the like at too high a speed of operation. In this embodiment of the invention, the vibration sensing means includes a mercury transducer switch 94 that, upon sensing a predetermined undesirable vibration level, is maintained substantially continuously closed to include a predetermined resistance 96 in parallel with the resistance 78 for varying the firing rate of the transistor 68.

By virtue of the above-described system, in addition to correlating the grinding action of the disposal unit 16 to particular types of materials, the unit, since it can run faster for lighter or soft materials, will have a materially reduced grinding cycle time over those units presently in use and, furthermore, in the case of heavier or harder materials, the speed can be reduced to prevent vibrations and thereby effect a quieter overall operation of the unit.

The basic concept of a domestic appliance having an A.C. induction motor controlled by a static solid state or semiconductor computer unit is set forth in our copending United States application Serial No. 159,014, filed December 13, 1961, now U.S. Patent No. 3,152,462. The present invention incorporates the basic advantages of appliance control by such static control devices, namely, greater control reliability and more exact control capability together with the further improvement comprising additional means for correlating the disposal operation to types of material being processed including the provision of the waste programmer in association with the semiconductor computer unit.

While the embodiment of the present invention as herein disclosed constitutes a preferred form, it is to be understood that other forms might be adopted.

What is claimed is as follows:

1. In a garbage disposal unit, the combination of, means for grinding material, A.C. induction motor means for operating said grinding means, solid state semiconductor computer means including switch means for regulating the average voltage to said A.C. induction motor, and means for sensing a plurality of operating conditions of said unit and adapted for producing plural signals to said computer means, and means in said computer means for simultaneously processing said signals for varying the speed of said motor means to produce an optimum grinding action.

2. In the combination of claim 1, said sensing means including a vibration responsive transducer and resistance means for varying the power output from said computer control unit in accordance with vibrations in said disposal unit.

3. In the combination of claim 1, said plurality of signals including a motor speed signal and a vibration signal, said computer control unit including means for simultaneously processing said signals to modify the power input to said motor for maintaining an optimum grinding action.

4. In a garbage disposal unit, the combination of, grinding means, A.C. induction motor means for operating said grinding means, solid state computer control means including switching means for regulating the average voltage input to said A.C. induction motor, speed sensing means for directing a motor speed correlated signal to said computer control unit for maintaining a predetermined motor speel norm for obtaining a first predetermined grinding action, and presettable programmer means for infinitely varying the speed input signal between predetermined limits for varying the grinding action to correspond to different types of waste material.

5. In the combination of claim 4, said programmer means including a manually adjustable control member and a variable resistance potentiometer operatively associated therewith and adjustable to modify the speed input signal to said computer control unit.

6. In the combination of claim 4, a vibration responsive transducer, and resistance means selectively included in circuit with said computer control unit in response to predetermined vibrations sensed by said transducer for reducing grinding speed by reducing the average voltage output from said computer control unit.

7. In the combination of claim 6, said programmer means including a manually adjustable control member and a variable resistance potentiometer operatively associated therewith and adjustable to modify the speed input signal to said computer control unit.

References Cited by the Examiner
UNITED STATES PATENTS

| | | | |
|---|---|---|---|
| 3,081,042 | 3/1963 | Muskovitz | 241—36 |
| 3,181,800 | 5/1965 | Noren | 241—36 X |
| 3,204,879 | 9/1965 | Reckers | 241—36 X |

WILLIAM W. DYER, JR., *Primary Examiner.*

H. F. PEPPER, *Assistant Examiner.*